Figure 1:
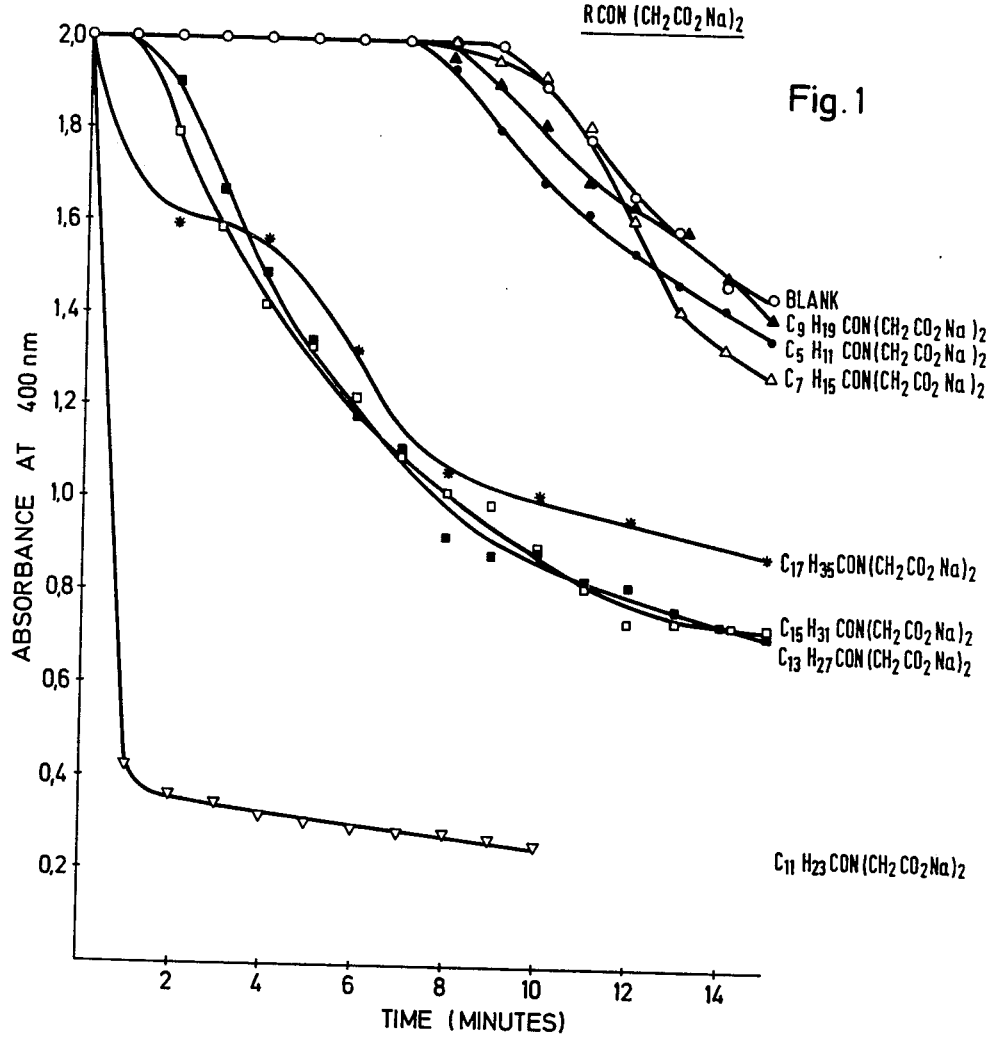

United States Patent [19]

Clark et al.

[11] 4,192,744

[45] Mar. 11, 1980

[54] TREATMENT OF AQUEOUS SYSTEMS

[75] Inventors: David R. Clark, Sale; Alan Marshall; Michael A. Finan, both of Macclesfield, all of England

[73] Assignee: Ciba-Geigy Corporation, Ardsley, N.Y.

[21] Appl. No.: 846,301

[22] Filed: Oct. 28, 1977

[30] Foreign Application Priority Data

Nov. 2, 1976 [GB] United Kingdom ............... 45464/76

[51] Int. Cl.$^2$ .......................... B01D 21/01; C02B 1/20
[52] U.S. Cl. ........................................ 210/54; 210/58; 252/180
[58] Field of Search ................. 134/22 R; 210/54, 58; 252/180, 181; 209/5

[56] References Cited

U.S. PATENT DOCUMENTS

| | | | |
|---|---|---|---|
| 2,790,778 | 4/1957 | Spivack et al. | 252/392 |
| 2,894,905 | 7/1959 | Bernard | 210/58 |
| 3,147,318 | 9/1964 | Jungk | 526/30 |
| 3,430,641 | 3/1969 | Newman | 210/58 |
| 3,479,284 | 11/1969 | Lees | 210/54 |
| 3,527,609 | 9/1970 | Vinso | 210/58 |
| 3,639,292 | 2/1972 | Gilby | 210/58 |
| 3,755,158 | 8/1973 | Inazuka et al. | 210/54 |
| 3,796,667 | 3/1974 | Block et al. | 210/58 |
| 3,894,946 | 7/1975 | Panzer et al. | 210/54 |
| 3,981,779 | 9/1976 | Block et al. | 210/58 |

OTHER PUBLICATIONS

Block et al. "Effect of Fe & Cu During Scale Suppression By Theshold Compounds," *Desalination* 1974, pp. 279–286.
Sexsmith et al. *Ind. Water Engineering*, Dec. 1969, p. 20.

*Primary Examiner*—Charles N. Hart
*Assistant Examiner*—Peter A. Hruskoci
*Attorney, Agent, or Firm*—Luther A. R. Hall

[57] ABSTRACT

Aqueous compositions containing compounds having the formula:

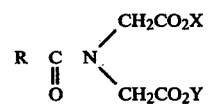

wherein R is a straight- or branched alkyl residue containing 11 to 17 carbon atoms and X and Y are the same or different and each is an alkali metal, an alkaline earth metal, ammonium, an amine radical or hydrogen for selectively flocculating iron ions.

3 Claims, 3 Drawing Figures

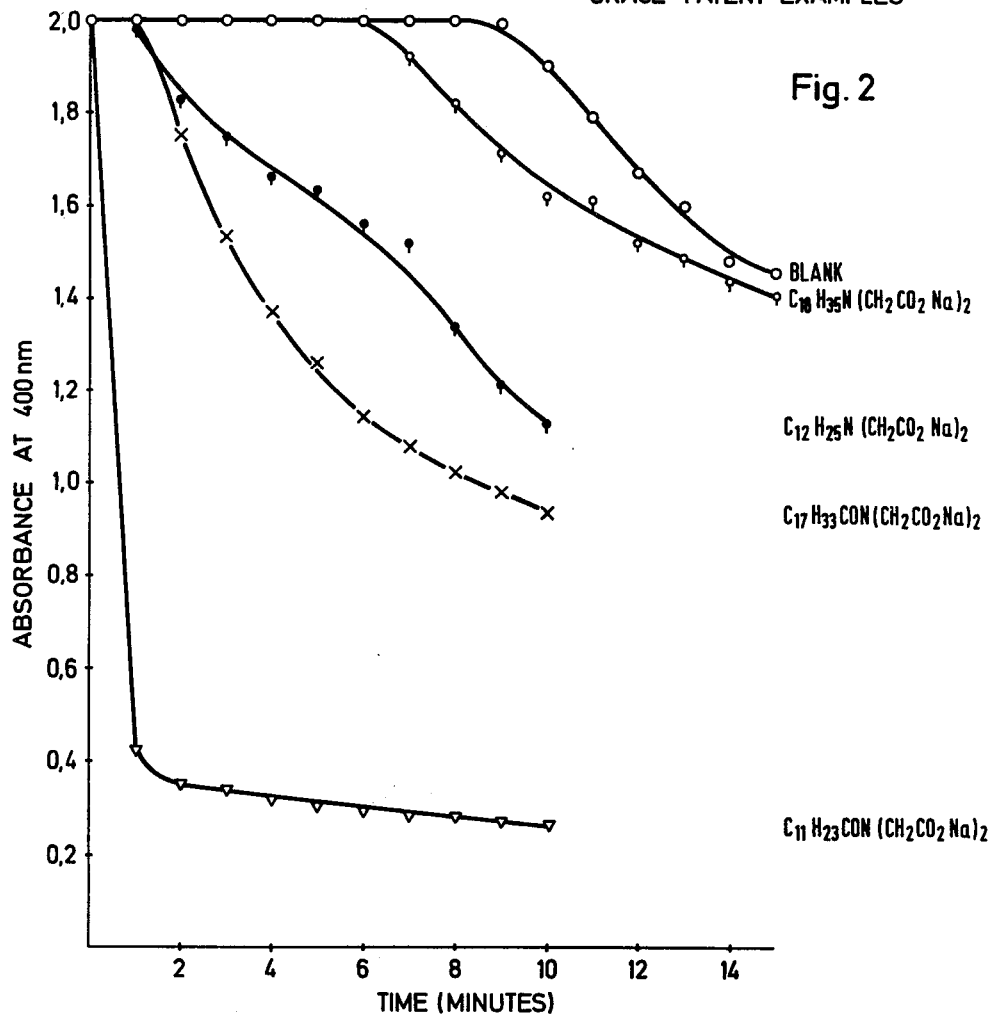

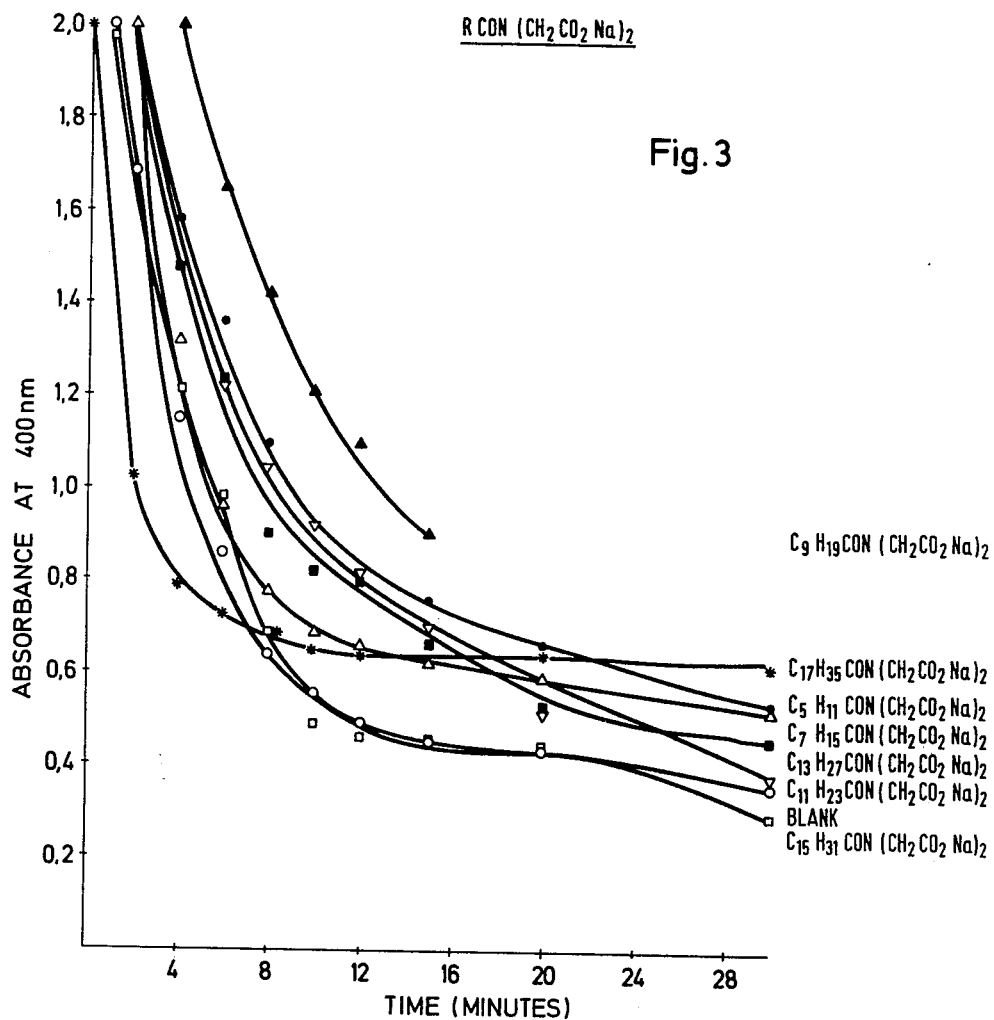

TREATMENT OF AQUEOUS SYSTEMS

This invention relates to aqueous compositions containing water soluble acylimino diacetic acids, particularly their salts, and provides for a process of treating water by which heavy metal ions are selectively flocculated and scale deposition is inhibited.

The majority of natural waters, and aqueous systems in general, contain dissolved salts of metals such as calcium, magnesium and barium in addition to the ubiquitous alkali metal salts. There is a need for selective flocculation of specific metal ions in the recovery and refining of minerals from their ores, for instance in the aqueous treatment processes of the metal extraction industry or the treatment of aqueous suspensions of coal, titanium dioxide, clays (e.g. kaolin) or ferric oxide.

The formation of insoluble deposits reduces the efficiency of heat exchangers and pipes of aqueous cooling systems and eventually causes shutdown of the cooling systems for cleaning. Hydrated iron oxides are a common constituent of such deposits and result from the gradual rusting process of ferrous metal surfaces. In desalination evaporators, iron oxide particles can influence the nature of the eventual scale formed on the heat transfer surfaces. Very brittle scales consisting of iron, calcium, and magnesium salts can be produced and can cause plant shutdown and/or damage to equipment (see the article "Desalination," 15 (1974) p. 279–86). Removal of suspended matter, to render it innocuous towards processes such as scale formation and corrosion, is therefore highly desirable. Whenever scale is formed, it should be such that it is easily removable from the surfaces by mechanical means (as discussed in the article by D. R. Sexsmith et al.; "Industrial Water Engineering". Dec. (1969), p. 20).

Polyelectrolytes of high molecular weight are generally used to effect flocculation of this nature (see British Pat. Specification No. 1297180; U.S. Pat. No. 3147318; U.S. Pat. No. 3479284; and U.S. Pat. No. 3894946.

In U.S. Pat. No. 2,790,778, rust preventive compositions are described consisting of an oleaginous vehicle and an acyliminodiacetic acid, or salt thereof, having the formula:

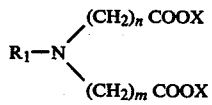

wherein $R_1$ represents an 8–24 C aliphatic carboxlic acid residue, n and m represent 1 or 2 respectively and X is H or a group capable of forming a salt with the carboxylic acid group.

Subsequently, in U.S. Pat. No. 3981779, a method for the prevention of scale deposition from aqueous systems is described, in which the additive used is a compound having the formula:

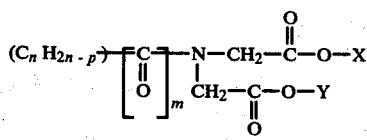

wherein n is an integer from 8 to 18, p is minus one, 1,3 or 5, m is 0 or 1 and X and Y are selected from H, $NH_4$, and monovalent metals other than monovalent metals which form amine or ammonia complexes.

While flocculation of iron oxide particles is a known method of preventing the deposit from adhering to the metal surfaces, having been described in British patent specification No. 1297180, wherein the said flocculation is achieved using polymeric compounds, we have now found certain water-soluble salts of acylimino diacetic acids of comparatively low molecular weight which can be employed at very low use levels. Any excess of the compounds of the invention may also be beneficial to the aqueous system by acting per se as a corrosion inhibitor for iron. The said compounds are very effective as flocculants for insoluble heavy metal salts, particularly ferric oxide. Since ferric oxide can influence the formation of scales containing calcium and magnesium, the said compounds also have a beneficial effect in delaying scale formation and reducing the adherence of these scales, when formed, to metal surfaces.

Accordingly, the present invention provides aqueous compositions containing compounds having the formula:

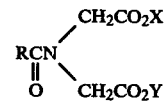

wherein R is a straight- or branched alkyl residue containing 10 to 17, preferably 11 to 15, especially 11 carbon atoms, and X and Y are the same or different and each is an alkali metal, alkaline earth metal, ammonium or amine radical, or hydrogen.

Examples of alkyl residues R are n-dodecyl, n-tridecyl, n-tetradecyl, n-pentadecyl, n-hexadecyl and n-heptadecyl groups, as well as various branched chain analogues of these substituents; preferably, however, R is n-undecyl.

When X and/or Y is an amine radical, it may be, e.g. an alkylamine radical having 1–4 carbon atoms in each alkyl moiety, especially mono-, di- or trimethylamine or mono-, di- or triethylamine radical or mono-, di- or triethanolamine or a pyridine radical e.g. picoline. Preferred radicals X and/or Y, however, are sodium, potassium or ammonium radicals.

Specific examples of compounds of formula I include:
Di-sodium-N-undecanoyliminodiacetate
Mono-sodium-N-lauroyliminodiacetate
Disodium-N-lauroyliminodiacetate
Mono-potassium-N-lauroyliminodiacetate
Dipotassium-N-lauroyliminodiacetate
Mono-ammonium-N-lauroyliminodiacetate
Diammonium-N-lauroyliminodiacetate
Mono-sodium-N-myristoyliminodiacetate
Disodium-N-myristoyliminodiacetate
Mono-sodium-N-palmitoyliminodiacetate
Disodium-N-palmitoyliminodiacetate
Mono-sodium-N-stearoyliminodiacetate and
Disodium-N-stearoyliminodiacetate Compounds of formula I may be conveniently prepared by reacting an acyl halide RCOZ, wherein R has its previous significance and Z is Cl, Br or F, with the salt of an iminodiacetic acid derivative of formula HN($CH_2CO_2X$)($CH_2CO_2Y$) wherein X and Y have their previous significance. A constant alkaline pH value is preferably maintained throughout the reaction by the addition of a suitable salt of cation X and/or Y.

As already premised, the compounds of formula I selectively flocculate insoluble compounds of certain heavy metal ions, especially iron, in the presence of calcium ions, and thereby inhibit the formation of adherent alkaline scales.

Accordingly, the present invention further provides a method of treating an aqueous system to selectively flocculate compounds of iron ions therefrom, comprising adding to the aqueous system a minor proportion of a compound of formula I, as hereinbefore defined.

The compounds contained in the aqueous compositions described in the invention may be used singly or in admixture in an aqueous system to be treated in conjunction with other compounds known to be useful in water treatment. Dispersing and/or other threshold agents may be used and/or scale control agents such as, for example, polymerised acrylic acid and its salts, polymerised methacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, alkylamino bis methylene phosphonic acids, 1-hydroxyalkyl-1,1-diphosphonic acids, nitrilo trimethylene phosphonic acid, and cellulose. Specific threshold agents such as, for example, hydrolysed polymaleic anhydride and its salts, alkyl phosphonic acids, 1-aminoalkyl-1,1-diphosphonic acids and their salts and alkali metal phosphates may also be used.

Aqueous compositions of the present invention may also be used in conjunction with precipitating agents such as alkali metal orthophosphates, carbonates and hydroxides, oxygen scavengers such as alkali metal sulphites and hydrazine, and sequestering agents such as nitrilotriacetic acid and its salts, and ethylene diamine tetraacetic acid and its salts. They may also be used in combination with corrosion inhibitors such as chromates, for example sodium chromate, nitrites such as sodium nitrite; phosphates, polyphosphates soluble zinc salts, phosphonic acids, cyclohexylamine, phosphonocarboxylic acids, distearylamine, morpholine, stearylamine, ethylene oxide condensation products, and also in conjunction with antifoaming agents such as distearyl sebacamide, distearyl adipamide and related products derived from ethylene oxide condensations, in addition to fatty alcohols such as capryl alcohols and their ethylene oxide condensates.

The amount of the compound of formula I which may be used in the method according to the invention is preferably within the range 0.1 to 500 parts per million, especially 2 to 100 parts per million based on the water to be treated.

The following Examples illustrate specific embodiments of the present invention but are not intended to limit the invention.

FIG. 1-3 graphically illustrate the results presented in the Examples.

EXAMPLES 1-4

The flocculant or dispersant activity of a compound is demonstrated in a test entailing producing a 2000 ppm dispersion of the insoluble material and measuring its rate of settling during a period of time.

(a) effect against iron oxides

Iron oxides are prepared by adding, with vigorous stirring, an excess of 0.880 ammonium hydroxide solution to 500 ml. of a 20% aqueous solution of $FeSO_4.7H_2O$, boiling the solution and filtering the resultant precipitate under reduced pressure, through a Whatman No. 54 filter paper, washing the precipitate with hot water and drying at 105° C. for 2-3 hours.

The resultant dark brown dried oxide is hard ground to a fine consistency and 0.2 gram weighed into a 100 ml. measuring cylinder containing 80 ml. distilled water. The mixture is warmed to 50° C. in a water bath and 20 ml. of a 0.05% w/w solution of the compound under test added with thorough stirring. After allowing the suspension to cool to ambient temperature, it is thoroughly mixed and a sample poured into a 4 cm. glass cell, and placed in a Unicam SP 1800 spectrophotometer. The absorbance of the suspension is then measured at a wavelength of 400 nm. at various time intervals.

(b) effect against $CaCO_3$

To 50 ml of distilled water in a 100 ml measuring cylinder is added 0.44 g. of $CaCl_2.6H_2O$, the solution is warmed to 50° C. in a water bath and 50 ml of a $Na_2CO_3$ solution (containing 4.24 g $Na_2CO_3$/liter) also at 50° C. is added with stirring. To the suspension is added with stirring 1 ml, of a 0.05% w/w solution of the compound under test. The suspension is allowed to cool then remixed and the absorbance measured as in (a) above.

(c) effect against calcium phosphates 0.2 gm, of laboratory reagent grade tri-calcium orthophosphate is added to 100 ml of distilled water and 0.4 ml of 0.1M NaOH solution in a 100 ml measuring cylinder. The suspension is heated to 50° C. in a water bath and 1 mol of a 0.05% w/w solution of the compound under test is added with vigorous stirring. The suspension is allowed to cool to ambient temperature, remixed and the absorbance measured as in (a) above.

In each case the absorbance is compared with the absorbance of a suspension containing no additive. A rapid fall in absorbance indicates that flocculation occurs, whereas figures which are consistently higher than control indicate the presence of a dispersant.

Additives tested were as follows:

| Example | Structure | Symbol on graphs |
|---|---|---|
| Comparative A | $C_5H_{11}CON(CH_2CO_2Na)_2$ | —o——o— |
| Comparative B | $C_7H_{15}CON(CH_2CO_2Na)_2$ | —△——△— |
| Comparative C | $C_9H_{19}CON(CH_2CO_2Na)_2$ | —△——△— |
| Example 1 | $C_{11}H_{23}CON(CH_2CO_2Na)_2$ | —▽——▽— |
| Example 2 | $C_{13}H_{27}CON(CH_2CO_2Na)_2$ | —◻——◻— |
| Example 3 | $C_{15}H_{31}CON(CH_2CO_2Na)_2$ | —◻——◻— |
| Example 4 | $C_{17}H_{35}CON(CH_2CO_2Na)_2$ | —※——※— |
| Example 5 | $C_{10}H_{21}CON(CH_2CO_2Na)_2$ | |
| Comparative D | $C_{17}H_{33}CON(CH_2CO_2Na)_2$ | —※——※— |
| Comparative E | $C_{12}H_{25}N(CH_2CO_2Na)_2$ | —?——?— |
| Comparative F | $C_{17}H_{35}N(CH_2CO_2Na)_2$ | —?——?— |

Comparative Examples D, E and F are typical products described in U.S. Pat. No. 3,981,779.

The results obtained are set out in the following Tables which also include data relating to commercial products Magnafloc 156 (a high molecular weight cationic polyacrylamide) and 1-hydroxyethylidene-1,1-diphosphonic acid (ADPA).

TABLE 1

Hydrated Ferric Oxide (additive dose level 100 ppm.)

ABSORBANCE AT 400 nm Time (minutes)

| Example | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Control | >2 | >2 | >2 | >2 | >2 | >2 | >2 | >2 | >2 | 1.99 | 1.90 | 1.79 | 1.67 | 1.60 | 1.48 | 1.46 |
| Magnafloc 156 | >2 | 0.74 | 0.70 | 0.69 | 0.68 | 0.68 | 0.68 | 0.68 | 0.68 | 0.67 | 0.67 | — | — | — | — | — |
| ADPA | >2 | >2 | >2 | >2 | >2 | >2 | >2 | >2 | >2 | >2 | >2 | >2 | >2 | >2 | >2 | >2 |
| Comparative A | >2 | >2 | >2 | >2 | >2 | >2 | >2 | >2 | 1.94 | 1.81 | 1.70 | 1.63 | 1.55 | 1.48 | 1.43 | 1.37 |
| Comparative B | >2 | >2 | >2 | >2 | >2 | >2 | >2 | >2 | 1.96 | 1.96 | 1.92 | 1.82 | 1.62 | 1.42 | 1.34 | 1.28 |
| Comparative C | >2 | >2 | >2 | >2 | >2 | >2 | >2 | >2 | 2.0 | 1.91 | 1.82 | 1.70 | 1.65 | 1.60 | 1.50 | 1.41 |
| Example 1 | >2 | 0.42 | 0.35 | 0.34 | 0.31 | 0.30 | 0.29 | 0.28 | 0.28 | 0.27 | 0.26 | — | — | — | — | — |
| Example 2 | >2 | >2 | 1.90 | 1.67 | 1.49 | 1.34 | 1.18 | 1.11 | 1.02 | 0.88 | 0.88 | 0.83 | 0.82 | 0.77 | 0.74 | 0.72 |
| Example 3 | >2 | >2 | 1.79 | 1.59 | 1.42 | 1.33 | 1.22 | 1.10 | 1.02 | 0.99 | 0.89 | 0.82 | 0.74 | 0.74 | 0.74 | 0.73 |
| Example 4 | >2 | 1.59 | 1.56 | 1.32 | 1.14 | 1.01 | 0.96 | 0.88 | 0.80 | — | — | — | — | — | — | — |
| Example 5 | >2 | >2 | >2 | >3 | 1.78 | 1.58 | — | 1.33 | 1.16 | 1.01 | 0.92 | — | 0.76 | — | — | 0.58 |
| Comparative D | >2 | 2.0 | 1.75 | 1.53 | 1.36 | 1.26 | 1.14 | 1.08 | 1.02 | 0.98 | 0.93 | — | — | — | — | — |
| Comparative E | >2 | 1.98 | 1.82 | 1.75 | 1.66 | 1.63 | 1.56 | 1.52 | 1.33 | 1.21 | 1.13 | — | — | — | — | — |
| Comparative F | >2 | >2 | >2 | >2 | >2 | >2 | >2 | 1.92 | 1.82 | 1.71 | 1.62 | 1.61 | 1.52 | 1.49 | 1.44 | 1.41 |

TABLE 2

Calcium Carbonate (additive dose level 5 ppm)

ABSORBANCE AT 400 nm Time (minutes)

| Example | 0 | 1 | 2 | 3 | 4 | 5 | 6 | 7 | 8 | 9 | 10 | 11 | 12 | 13 | 14 | 15 | 20 | 30 |
|---|---|---|---|---|---|---|---|---|---|---|---|---|---|---|---|---|---|---|
| Control | >2 | >2 | 1.68 | 1.39 | 1.15 | 1.00 | 0.86 | 0.74 | 0.64 | 0.62 | 0.56 | 0.54 | 0.49 | 0.45 | 0.45 | 0.45 | 0.43 | 0.35 |
| Magnafloc 156 | >2 | >2 | 1.70 | 1.42 | 1.22 | 0.87 | 0.80 | 0.74 | 0.56 | 0.56 | 0.50 | 0.46 | 0.45 | 0.44 | 0.37 | 0.36 | 0.33 | 0.26 |
| ADPA | >2 | >2 | >2 | >2 | 1.60 | 1.10 | 1.01 | 0.70 | 0.64 | 0.59 | 0.56 | 0.53 | 0.40 | 0.39 | 0.37 | 0.37 | 0.30 | 0.19 |
| Comparative A | >2 | >2 | >2 | 1.74 | 1.58 | 1.44 | 1.36 | 1.24 | 1.10 | 0.95 | 0.93 | 0.87 | 0.84 | 0.81 | 0.81 | 0.76 | 0.66 | 0.53 |
| Comparative B | >2 | >2 | >2 | 1.70 | 1.32 | 1.09 | 0.96 | 0.80 | 0.78 | 0.78 | 0.69 | 0.68 | 0.67 | 0.64 | 0.62 | 0.62 | 0.59 | 0.52 |
| Comparative C | >2 | >2 | >2 | >2 | 2.0 | 1.80 | 1.65 | 1.52 | 1.42 | 1.30 | 1.21 | 1.19 | 1.10 | 0.97 | 0.90 | 0.90 | — | — |
| Example 1 | >2 | >2 | >2 | 1.74 | 1.52 | 1.36 | 1.22 | 1.13 | 1.04 | 0.98 | 0.91 | 0.87 | 0.82 | 0.79 | 0.74 | 0.70 | 0.51 | 0.36 |
| Example 2 | >2 | >2 | >2 | 1.79 | 1.48 | 1.42 | 1.24 | 1.01 | 0.90 | 0.88 | 0.82 | 0.81 | 0.80 | 0.75 | 0.68 | 0.66 | 0.53 | 0.45 |
| Example 3 | >2 | >2 | 1.98 | 1.50 | 1.21 | 1.06 | 0.98 | 0.80 | 0.69 | 0.51 | 0.49 | 0.50 | 0.47 | 0.46 | 0.46 | 0.46 | 0.44 | 0.29 |
| Example 4 | >2 | 1.02 | 0.79 | 0.73 | 0.69 | 0.65 | 0.65 | 0.67 | 0.66 | 0.62 | 0.61 | — | — | — | — | — | — | — |
| Comparative D | >2 | 1.26 | 0.80 | 0.66 | 0.61 | 0.58 | 0.40 | 0.36 | 0.36 | 0.34 | 0.34 | 0.34 | 0.34 | 0.27 | 0.26 | 0.26 | 0.22 | 0.18 |
| Comparative E | >2 | >2 | >2 | 1.95 | 1.66 | 1.54 | 1.40 | 1.22 | 1.12 | 1.02 | 0.92 | 0.87 | 0.82 | 0.76 | 0.70 | 0.65 | 0.48 | 0.30 |
| Comparative F | >2 | >2 | 1.18 | 0.84 | 0.68 | 0.53 | 0.45 | 0.44 | 0.41 | 0.39 | 0.36 | 0.36 | 0.35 | 0.33 | 0.30 | 0.30 | 0.29 | 0.28 |

TABLE 3

Calcium Phosphate (Additive dose level 5 ppm.)

ABSORBANCE AT 400 nm Time (minutes)

| Example | 0 | 2 | 4 | 6 | 8 | 10 | 12 | 15 | 20 | 25 | 30 | 40 | 50 | 60 | 70 | 75 | 90 | 120 |
|---|---|---|---|---|---|---|---|---|---|---|---|---|---|---|---|---|---|---|
| Control | >2 | >2 | >2 | >2 | >2 | 1.88 | — | 1.63 | 0.98 | — | 0.69 | 0.58 | 0.52 | 0.46 | — | 0.39 | 0.39 | 0.28 |
| Magnafloc 156 | >2 | 0.46 | 0.41 | 0.38 | 0.37 | 0.35 | — | 0.33 | 0.30 | — | 0.28 | 0.26 | 0.23 | 0.21 | — | — | 0.15 | 0.10 |
| ADPA | >2 | >2 | >2 | >2 | >2 | >2 | — | >2 | >2 | — | >2 | >2 | >2 | 1.95 | — | 1.67 | 1.48 | 1.21 |
| Comparative A | >2 | >2 | >2 | >2 | >2 | >2 | >2 | >2 | 1.99 | 1.66 | 1.49 | 1.00 | 0.78 | — | 0.60 | — | 0.54 | 0.48 |
| Comparative B | >2 | >2 | >2 | >2 | >2 | >2 | 1.85 | 1.64 | 1.31 | 1.12 | 0.94 | 0.72 | 0.58 | — | 0.46 | — | 0.37 | 0.31 |
| Comparative C | >2 | >2 | >2 | >2 | 1.98 | 1.80 | 1.63 | 1.39 | 1.10 | 0.95 | 0.79 | 0.58 | 0.45 | — | 0.37 | — | 0.31 | 0.26 |
| Example 1 | >2 | >2 | >2 | 1.69 | 1.61 | 1.53 | — | 1.42 | 0.68 | — | 0.38 | 0.27 | 0.23 | 0.20 | — | 0.18 | 0.16 | 0.15 |
| Example 2 | >2 | >2 | >2 | >2 | 1.96 | 1.72 | 1.53 | 1.24 | 0.87 | 0.73 | 0.60 | 0.46 | 0.44 | — | 0.35 | — | 0.27 | 0.24 |
| Example 3 | >2 | >2 | >2 | >2 | 1.94 | 1.73 | 1.56 | 1.31 | 0.80 | 0.72 | 0.59 | 0.52 | 0.40 | — | 0.29 | — | 0.24 | 0.21 |
| Example 4 | >2 | 1.18 | 0.94 | 0.78 | — | 0.65 | 0.61 | 0.59 | 0.55 | — | 0.49 | 0.46 | 0.44 | 0.42 | — | 0.41 | 0.39 | 0.36 |
| Comparative D | >2 | >2 | >2 | 1.54 | 1.33 | 0.95 | — | 0.75 | 0.62 | — | 0.50 | 0.40 | 0.37 | 0.34 | — | — | — | — |
| Comparative E | >2 | >2 | >2 | >2 | >2 | 1.84 | 1.62 | 1.35 | 0.80 | — | 0.61 | 0.54 | 0.49 | 0.37 | — | — | 0.28 | 0.16 |
| Comparative F | >2 | >2 | >2 | 1.53 | 1.28 | 1.04 | 0.95 | 0.67 | 0.56 | — | 0.46 | 0.40 | 0.32 | 0.30 | — | — | 0.21 | 0.16 |

The results in the Tables clearly demonstrate (a) that the compounds of formula I used in the compositions of the invention exhibit excellent flocculation of iron oxide and (b) that this flocculation power is selective to iron oxide since the said compounds have no flocculating effect on calcium carbonate and only slight flocculating effect on calcium phosphate. Comparisons against compounds of very close chemical structure demonstrate the unexpected and surprising nature of the flocculation effect, selective to iron oxide, exhibited by the compounds of formula I.

What is claimed is:

1. A method of treating an aqueous system to flocculate dispersed $Fe_2O_3$ (hydrated) selectively therefrom which comprises adding to the aqueous system from 0.1 to 500 ppm, based on the water to be treated, of a compound having the formula I

wherein R is n-undecyl and X and Y are the same or different and each is an alkali metal, an alkaline earth metal, ammonium, an amine radical or hydrogen.

2. A method according to claim 1 wherein X and Y are independently selected from the group consisting of sodium, potassium and ammonium radical.

3. A method as claimed in claim 1, wherein the amount of the compound of formula I is within the range of from 2 to 100 ppm, based on the water to be treated.

* * * * *